2,330,649

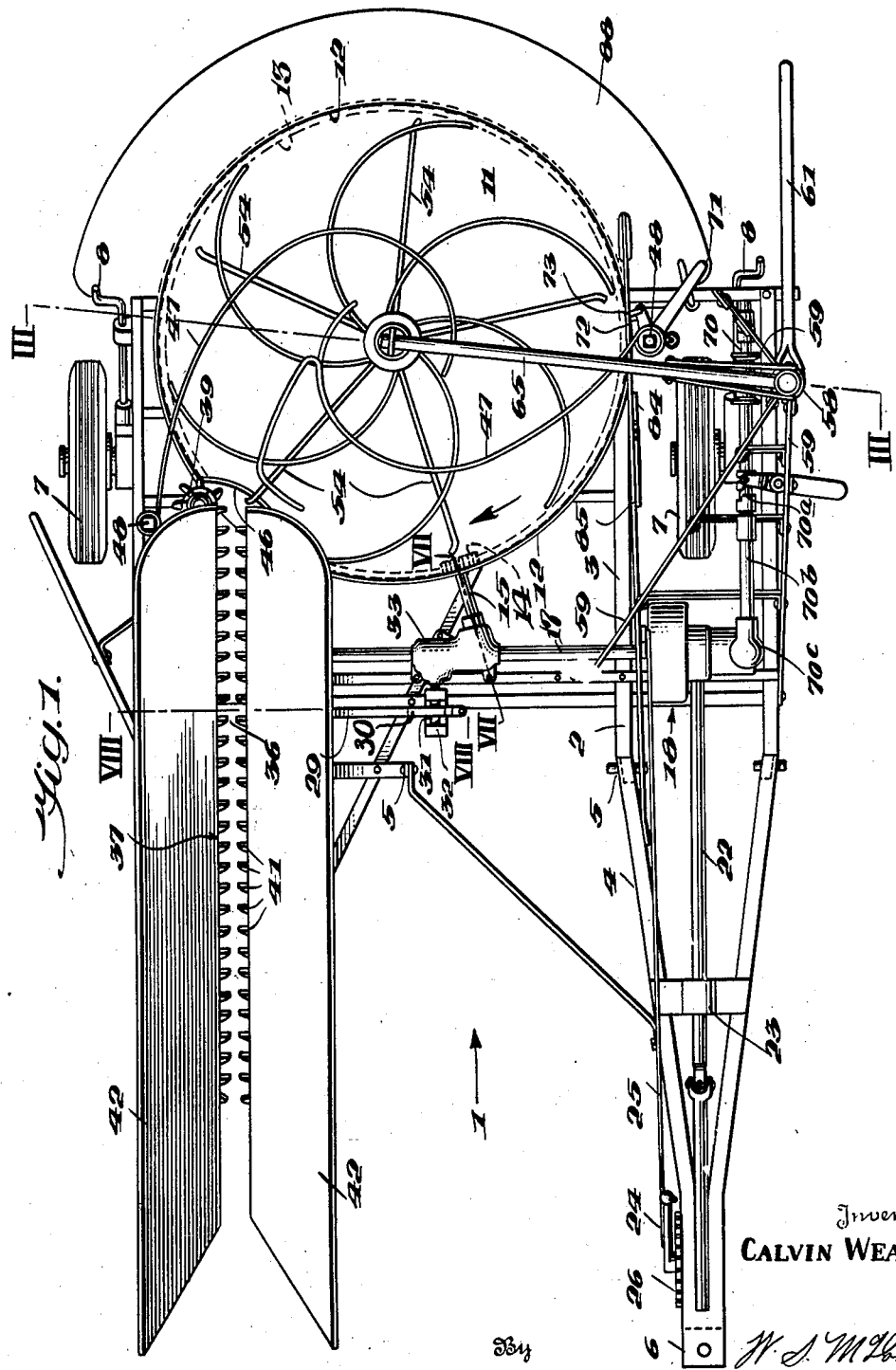

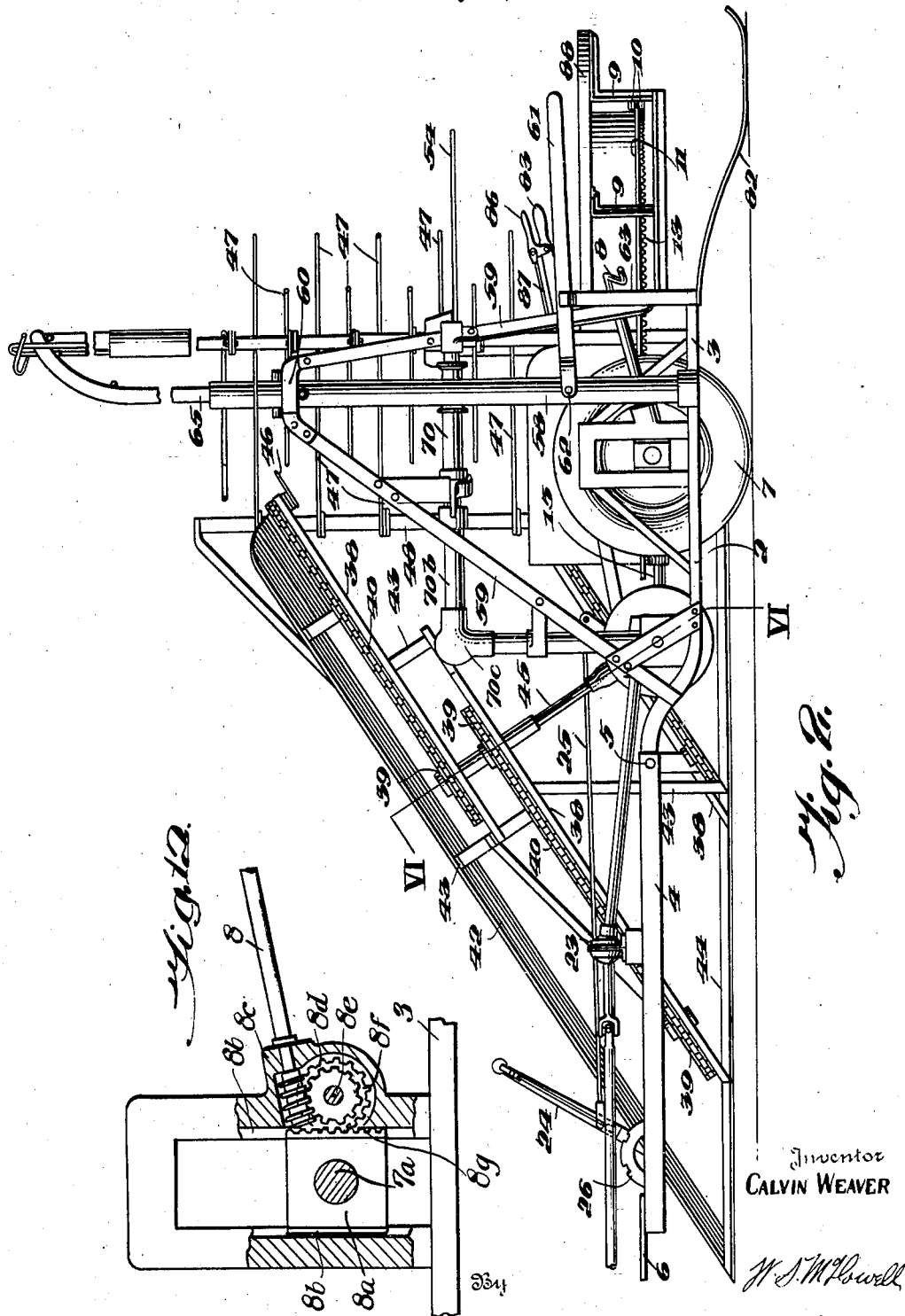

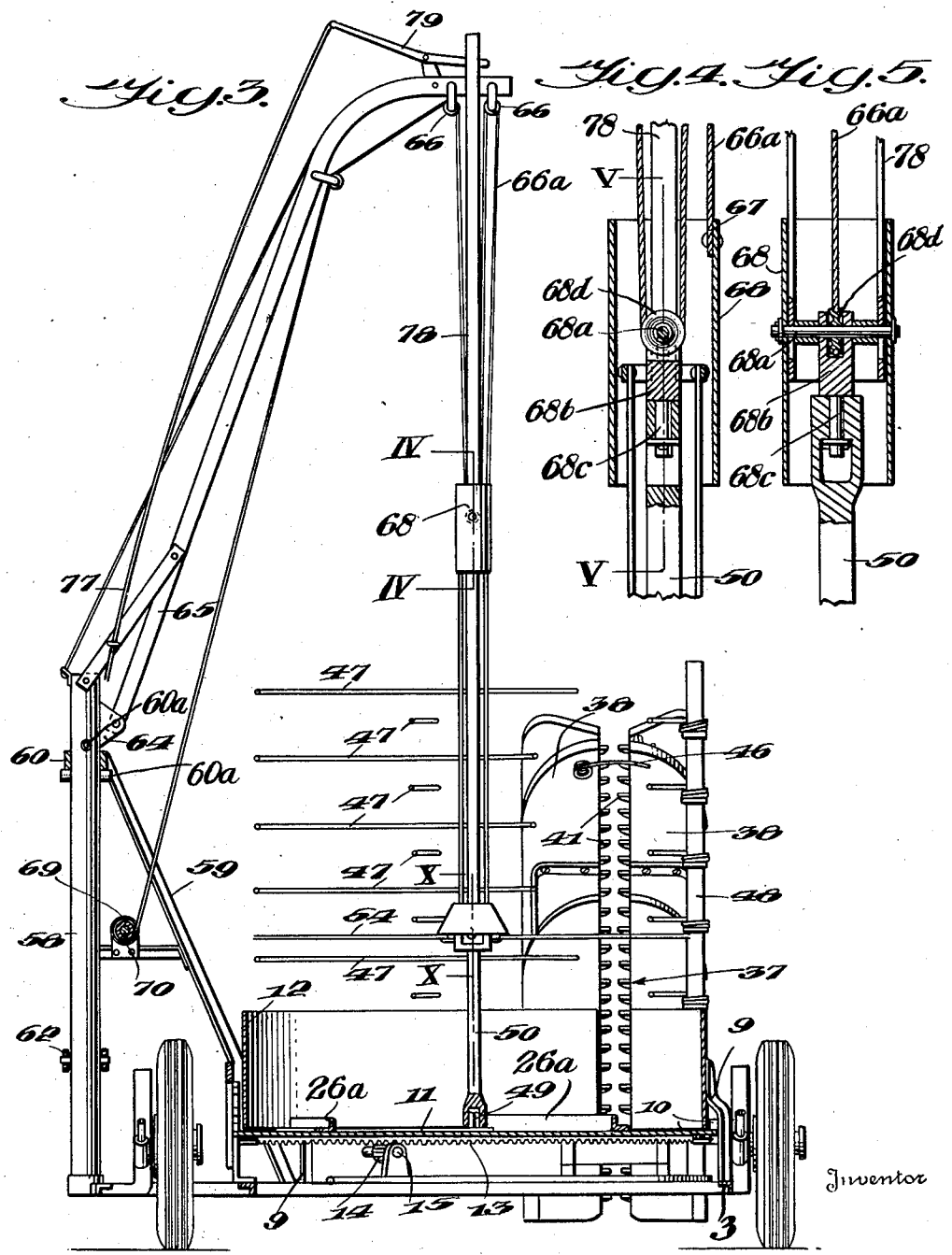

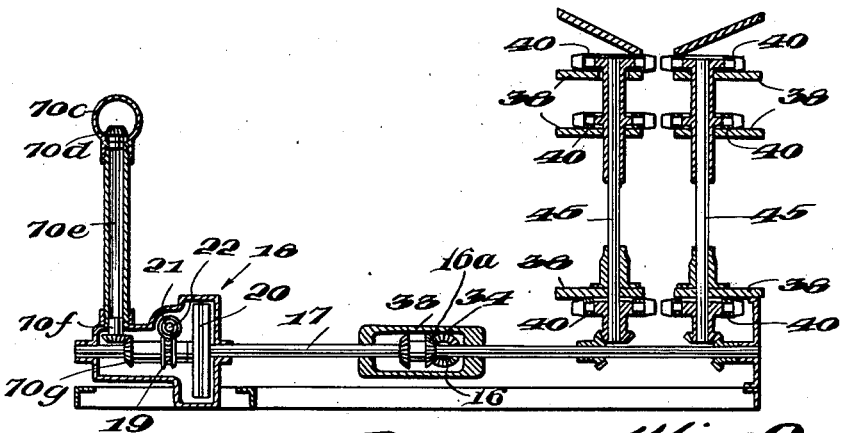
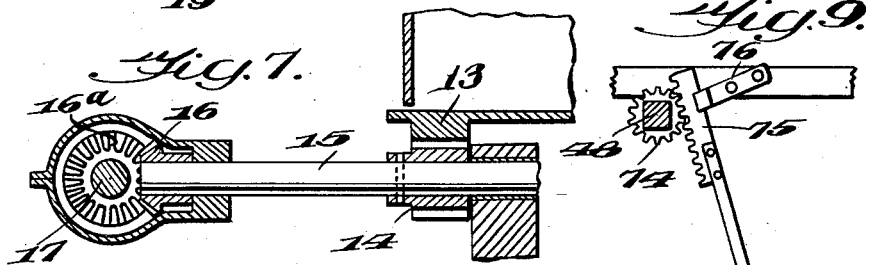
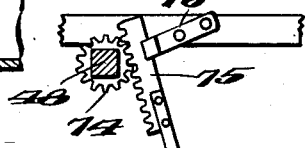
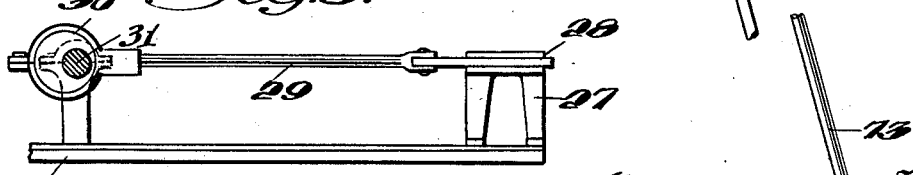
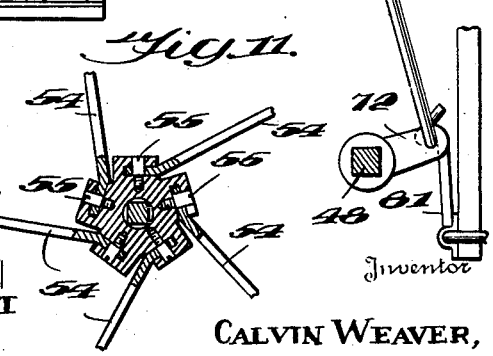
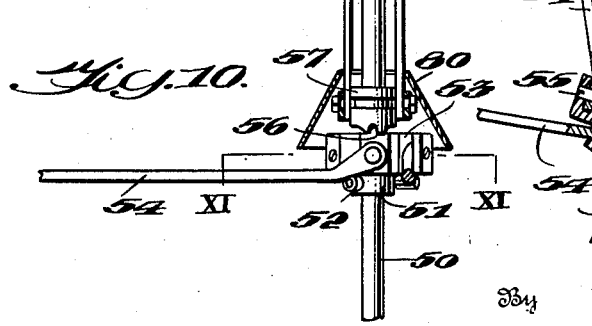
Inventor
CALVIN WEAVER, Patented Sept. 28, 1943

UNITED STATES PATENT OFFICE 2,330,649

TRACTOR DRIVEN CORN SHOCKER

Calvin Weaver, Mechanicsburg, Ohio

Application May 23, 1941, Serial No. 394,933

1 Claim. (Cl. 56—73)

This invention relates generally to agricultural machinery and more specifically to a tractor driven mechanism for cutting and shocking corn.

An object of the present invention resides in the provision of a machine which may be attached to a tractor and moved over the ground at a fairly rapid rate, the machine having cutting, conveying and shock-forming means which are positively driven through a power transmission directly connected with the power take-off of the tractor.

Another object of the invention rests in providing the machine with a jib and hoist by means of which the shock can be raised, moved to one side of the machine and placed upon the ground after being formed.

A further object resides in the provision of a corn shocker having a rotary table and means for cutting and conveying upstanding corn stalks to the table, resilient means also being provided to bunch the stalks about the central portion of the table and maintain them in upright positions during the bunching or shock-forming operation.

A still further object is the provision of means between the conveying means and the rotary table for engaging and yieldably holding the cut stalks until a sufficiently large group has collected to prevent the stalks from falling or being otherwise misaligned during transfer from the conveyor to the shock-forming table.

Another object rests in providing means for guiding the stalks while upright, to the central portion of the table, the means being resilient whereby to accommodate a constantly growing shock, the guiding means being so mounted as to be capable of being released and moved out of the way when the shocks are raised and swung to their positions of rest upon the ground.

An object also resides in providing a vertical post member at the central portion of the table, radiating arms being carried by the post member for rotation in unison with the table to assist in moving the corn stalks and holding the same upright, the arms also assisting in the operation of raising the formed shock when it is to be transferred from the machine to the ground, the connection between the arms and the center post being such that the arms may move into parallel relation with the post to permit the shock to be deposited on the ground and the post and arms removed therefrom.

Other objects and advantages will be apparent from the following description and the accompanying drawings in which a corn shocker formed in accordance with the present invention has been disclosed in detail.

In the drawings:

Fig. 1 is a plan view of a corn cutting and shocking machine formed in accordance with the present invention;

Fig. 2 is a side elevational view of the machine shown in Fig. 1;

Fig. 3 is a vertical transverse sectional view taken through the machine on the plane indicated by the line III—III of Fig. 1;

Fig. 4 is a detail vertical sectional view on the line IV—IV of Fig. 3, and taken through the connection between the center post of the rotary table and the means for elevating the same;

Fig. 5 is a similar view taken on the plane indicated by the line V—V of Fig. 4;

Fig. 6 is a detail sectional view taken on the plane indicated by the line VI—VI of Fig. 2, this figure showing the means for driving the stalk conveyor;

Fig. 7 is a detail sectional view taken on the plane indicated by the line VII—VII of Fig. 1;

Fig. 8 is a similar view taken on the plane indicated by the line VIII—VIII of Fig. 1, the view being limited to the showing of the means for moving the cutter blade;

Fig. 9 is a plan view partly in horizontal section showing the means for moving the flexible guiding members out of contact with the formed shocks;

Fig. 10 is a detail vertical sectional view taken on the plane indicated by the line X—X of Fig. 3;

Fig. 11 is a detail horizontal sectional view taken on the plane indicated by the line XI—XI of Fig. 10;

Fig. 12 is a detail view, partly in vertical section, disclosing the adjustable journals for the ground-engaging wheels.

Referring more particularly to the drawings, the numeral 1 designates the tractor driven corn shocker in its entirety. This machine includes a frame 2 having a pair of sections 3 and 4 which are hinged as at 5 for movement about a horizontal axis. The section 4 extends forwardly from the section 3 and is provided at its forward end with a plate 6 by means of which the frame is secured to the rear end of a tractor in order that when the tractor moves in a forward direction, the machine will be drawn after it. To provide for movement of the frame over the ground, the section 3 has a pair of ground engaging wheels 7 secured thereto, the mounting for the wheels being independently adjustable through the operation of cranks 8 to maintain the frame in a substantially horizontal position even when the device is used on sloping ground.

Such adjustment may be effected by mounting the stud axles 7a of the wheel 7 in journal boxes 8a, the latter, in turn, being mounted for vertical adjustment in the box guides 8b of the frame 3. Each box 8a may be moved vertically of the guides by providing the lower or forward end of each of the shafts or cranks 8 with a worm 8c arranged to mesh with a worm gear 8d, the latter being fixed to a horizontally journaled shaft 8e. Also fixed on the shaft 8e is a pinion 8f, the teeth of which mesh with rack teeth 8g provided on one side of the associated journal box 8a. The worm and worm gear mechanism serve to secure automatically the boxes 8a in their various positions of vertical adjustment.

The frame section 3 is composed of interconnected longitudinally and transversely extending structural steel bars.

To the rear portion of the frame section 3, there are secured a plurality of spaced brackets 9. The inner sides of the brackets have sets of rollers 10 journaled thereon, these rollers being spaced to receive the edge of a disk 11 which constitutes the rotary table of the machine. The brackets also support a vertical wall 12 at the edge of the table. The under side of the disk 11 has a ring gear 13 secured thereto, the teeth of this member meshing with the teeth on a pinion 14 carried by a stub shaft 15 journaled in bearings secured to the frame section 3. When the shaft 15 revolves, the teeth on the pinion 14 engage the teeth on the ring gear and cause the disk 11 to revolve.

Rotary motion is imparted to the shaft 15 through engagement of bevel gears 16 and 16a one of which is secured to the shaft 15 and the other to a shaft 17 forming a part of power transmission 18. This transmission is also carried by the frame 2 and, as illustrated in Fig. 6, includes a worm wheel 19 and clutch means 20 for connecting the worm wheel to the shaft 17. The worm wheel meshes with a worm 21 carried at the rear end of a shaft 22 which extends longitudinally with respect to the machine and is supported at its forward end in bearing means 23 carried by the frame section 4. A plurality of shaft sections connect the shaft 22 with the power take-off of a tractor, not shown. The clutch 20, which may be of the conventional cone type, is controlled through the operation of a lever 24 pivotally supported by the frame section 4 and connected with the clutch through a rod 25. The lever 24 is held in its positions of adjustment through the engagement of a plunger movably carried by the lever with recesses in a quadrant 26 carried by the frame section 4.

It will be seen that as the shaft 22 is rotated, the worm and worm wheel will transmit this movement to the shaft 17 and through the provision of the bevel gears, rotary motion will be transmitted to the stub shaft 15 and, in turn, to the disk 11. The upper surface of this disk has a plurality of spiral guides 26a secured thereto, these guides terminating at their inner ends adjacent to the central portion of the disk and serving to cause severed stalks delivered thereto to move toward the center of the table when the latter is rotated.

At one side of the frame 3, there is provided a bracket 27 formed for the movable support of a knife blade 28. This blade is connected by a rod 29 with an eccentric 30 secured for rotation with a short shaft 31, the latter being journaled on the frame as at 32. One end of the shaft 31 extends into a housing 33 through which the shaft 17 projects. The inner end of the shaft 31 has a bevel gear 34 fixed thereto, the teeth of the gear meshing with a similar gear carried by the shaft 17. When the latter shaft revolves, rotary movement will be imparted to the shaft 31 and the eccentric carried thereby which rotation will impart movement to the knife 28 through the rod 29. As the knife reciprocates, it moves between a pair of spaced guide members and a forwardly directed projection 36 on the knife will sever corn stalks positioned between this member and the guides, the sides of the projection being sharpened to facilitate the movement thereof through the stalks. After the stalks have been severed, they are moved by means of conveyor mechanism, designated generally by the numeral 37, from the knife to the rotary table where they will be bunched to produce a shock.

The conveyor mechanism is so formed as to maintain the stalks in an upright position during the transfer from the knife to the table. As illustrated in Figs. 2, 3 and 6, the conveying mechanism includes a plurality of inclined vertically spaced sets of boards 38, the boards in each set being horizontally spaced. These boards carry bearings for the rotatable reception of sprockets 39, the teeth of the sprockets receiving endless chains 40, certain links of which are provided with laterally extending fingers 41. The fingers on the chains project into the spaces between the boards and engage the stalks which are guided into the spaces by the beveled ends of guiding boards 42 supported above the boards 38 by strip-like brackets 43, the lower ends of the boards 42 being braced by angle members 44 which extend forwardly from the frame section 3.

Movement is imparted to the chains through shafts 45 to which the sprockets 39 are secured, the lower ends of the shafts having beveled gears which mesh with similar gears carried by the outer end of the shaft 17. The gearing is so arranged that the fingers which project from the chains into the spaces between the boards will move toward the table and the stalks will be positively fed to the cutting knife and from this member to the rotary table. To prevent the stalks from falling over or being otherwise misaligned at the discharge end of the conveyor, one of the boards 40 is provided with a resilient rod 46 so connected with the board as to project across the space between the boards of the conveyor. This rod serves to temporarily halt the stalks in their movement from the conveyor to the table whereby the stalks will collect and be transferred as a group to the table.

To properly form the shock, the stalks must be moved toward and bunched around the central portion of the table. To cause this movement of the stalks, there is provided a plurality of vertically spaced resilient guides 47. These guides are arranged in two sets, each set being carried by a vertically extending post 48 supported for rotation on the frame section 3. The guides 47 are coiled around the posts prior to being connected therewith to increase the resiliency of the guides and permit their movement or flexing away from the central portion of the table when the shock increases in size during formation. The guides are curved as indicated in Fig. 1 and the inner ends terminate adjacent to the central portion of the table when the guides are operatively positioned.

To facilitate the movement of the stalks along the guides, the table is provided at its center with an upwardly directed projection 49 having a polygonal cross-section. This projection receives the lower end of a center post 50, the post having a socket for the reception of the projection 49. At a point intermediate of its length, the center post is provided with a collar 51 from which a plurality of rollers 52 project in a horizontal direction. Above the collar, a block 53 is journaled on the center post and this member has a plurality of vertical extending recesses formed in the sides for the reception of perforated ends of stalk moving arms 54. Pivots 55 extend through the perforations in the arms and adjustably secure the arms to the block 53.

The under sides of the arms engage the rollers 52 and when one or more of the arms are elevated to a horizontal position and the block 53 rotated about the axis of the center post, a projection 56 on the upper side of the block 53 will be moved into registration with a recess formed in the under side of a collar 57 adjustably carried by the center post, the latter being square in horizontal cross-section so that rotary movement thereof will impart similar movement to the collar. When the projection is positioned in the recess, the block 53 will be restrained against independent rotation and the arms 54 will be held in horizontal positions. As the table revolves, the center post will also revolve carrying with it the arms 54 and when the outer ends of these members pass the delivery end of the conveyor, the stalks held at this location by the rod 46 will be engaged thereby. Continued movement of the arms will cause the stalks to travel along the guides 47 toward the center portion of the table. As the stalks accumulate, a shock will thus be formed.

As indicated in Fig. 1, certain of the guides 47, at one side of the machine, have their outer ends bent away from the central portion of the table and toward the discharge end of the conveyor, these guides serving to assist the movement of the stalks from the end of the conveyor to the center of the table and prevent the stalks from falling over when one or a small group of stalks is delivered to the table. After a sufficient number of stalks have been cut and transferred to the table to form a shock of the desired size, the tractor is stopped and the clutch moved to a position to disengage the shaft 17 from the driving shaft.

This operation will arrest the movement of the conveyor and the rotation of the table. A rope may then be temporarily tied around the shock above the radiating arms 54 and the shock then raised from the table and moved to the ground. To perform this operation, the frame section 3 at the right side thereof is provided with a vertically extending column 58 which is mounted for rotation about its axis. The column is braced by bars 59 secured at their lower ends to the frame 3 and at their upper ends to a collar 60 through which the column extends. The collar serves as a bearing for the upper end of the column. The latter member is provided above and below the collar with rollers 60a which engage the upper and lower sides of the collar and prevent the column from moving longitudinally.

The column is maintained against rotation through the provision of a lever 61 pivotally connected as at 62 with the column adjacent to the lower portion, the lever normally being disposed in the forked end of a bracket 63 rising from the frame 3. The column has a plurality of ears 64 secured to the upper portion, the ears being spaced to receive the lower end of a jib member 65. The jib extends upwardly and angularly with respect to the column and terminates at its upper end in a horizontal extension which projects over the central portion of the table when the lever 61 is positioned in the bracket 63. The horizontal extension of the jib has a pair of pulleys 66 supported thereby, these members receiving a cable 66a which is secured at one end as at 67 to a tubular shield 68 carried by the upper end of the center post 50. The shield 68 receives the end of a transversely extending shaft 68a, the intermediate portion of which passing through registering openings provided in the bifurcated opening of a head 68b, the latter having a swiveled union 68c with the upper end of the post 50. Within the bifurcated upper end of the head 68b, there is mounted a pulley 68d around which the intermediate portion of the cable 66a is trained. The opposite end of the cable is connected with a drum 69 carried by a shaft 70 which is journaled in bearings supported by the bars 59.

Rotary movement is imparted to the drum by providing the shaft 70 with a hand operated clutch 70a which serves to connect and disconnect the shaft from another shaft section 70b, one end of which extends into a housing 70c and is provided with a bevel gear which meshes with a bevel gear 70d carried by the upper end of a vertical shaft 70e. The lower end of this shaft also carries a bevel gear 70f which meshes with a bevel gear 70g secured directly to the worm wheel 19. When the latter is rotated, the shafts 70e and 70b will also rotate and when the clutch 70a is engaged, similar movement will be transmitted to the shaft 70 which will cause the drum 69 to rotate.

When the drum 69 is revolved, the cable will be wound thereon and, due to the decrease in effective length of the cable, the center post will be drawn upwardly toward the upper end of the jib. Since the radiating arms 54 are positioned in the shock beneath the temporary tying rope, upward movement of the center post and the arms will impart similar movement to the shock. Prior to raising the shock, the guides 47 are disengaged therefrom by rotating the posts 48 about their longitudinal axes through the operation of a lever 71 connected with one of the posts. This post also has a short arm 72 connected therewith and a rod 73 is pivotally connected at one end with the arm 72, the rod extending transversely of the machine and terminating adjacent to the lower portion of the other post 48. This post carries a pinion 74, the teeth of which mesh with a rack 75 secured to the end of the rod 73. A guide bar 76 maintains the rack in meshing engagement with the pinion and as the first post is revolved, the rod 73 and the rack and pinion will impart similar movement to the second post. This movement of the posts serves to swing the flexible guide bars 47 away from their positions over the table, thus releasing the shock.

After the shock has been elevated from the table, the jib is swung about the axis of the post 58 through the actuation of the lever 61. This movement carries the shock to one side of the machine and when it is swung clear of the machine, rotation of the post 53 is discontinued. Tension is applied to a cable 77 to exert upward movement on a yoke 78, this member passing through a pivoted trigger 79 carried by the horizontal portion of the jib. When the trigger is actuated and the yoke is raised, the collar 57 will be drawn upwardly to release the projection 56 on the block 53. The weight of the radiating arms will cause the block 53 to rotate about the axis of the post 50 which movement will permit the arms 54 to drop to positions parallel with the post 50. The weight of the shock will thus cause the same to slide downwardly around the post 50 and be deposited upon the ground.

A frustoconical guard 80 surrounds the block 53 and the collar 57 to prevent the stalks from being caught thereon when the shock slides from the post. After the shock has dropped, the lever 61 is returned to its normal position, this movement serving to swing the jib to a position overhanging the table. The hoist mechanism may then be operated to lower the post 50 and the operator may guide the lower end to position the projection 49 in the socket at the lower end of the post. At this time, the lever 71 is moved to swing the guides 47 back toward the center portion of the table and when they have reached their normal position, a locking bar 81 will engage the down-turned end of the rod 73 to hold the posts 48 and the guides 47 in their normal positions. The apparatus is then in position to cut more stalks and form a new shock.

To prevent the machine from tipping when the shock is swung to a position of discharge, the frame section 3 has a flexible runner 82 secured thereto adjacent to the post 59. This runner will engage the ground and offer resistance to tipping movement of the machine. Further resistance may also be provided by forming the wheels from cast metal or securing weight members thereto. In some instances, it may be necessary to adjust the frame 3 to raise or lower the forward ends of the guide boards 42. When this operation is required, the workman may grasp the outer end of the hand lever 83 and exert upward or downward force thereto to move the frame sections about the pivot 5. The forward end of the hand lever is rigidly secured to the frame section 4 and one portion of the pivot means 5 passes through the lever. It will be seen that when movement is imparted to the lever, the frame section 3 will be rocked about the axis of the ground engaging wheels and this movement will be transferred by the frame 3 to the outer portion of the boards 42. The hand lever 83 is maintained in its positions of adjustment by the engagement of a pin 84 carried thereby in notches formed in a quadrant 85. The pin 84 is released from the quadrant by moving a hand grip 86 toward the lever, the former being connected with the pin by a wire 87.

Access to the shock forming mechanism by the workman is facilitated through the provision of an arcuate cat walk 88 which extends around the rear side of the table and is secured to certain of the brackets 9.

From the foregoing, it will be seen that a machine has been provided for cutting and shocking corn in a quick and easy manner. The machine is directly attached to a tractor and may be rapidly operated due to the provision of the means for cutting, conveying and shocking the stalks. By providing the temporary stop 46, the machine may be operated by a single workman. However, better results may be secured through the employment of two men.

What is claimed is:

In a corn cutting and shocking machine, a wheeled frame, stalk gathering and conveying means on said frame, means for cutting the stalks while the same are maintained in upright positions within said gathering and conveying means, a rotary shock-forming table carried by said frame for the reception of stalks discharged from said gathering and conveying means, a pair of turntable standards carried by said frame at the opposite sides of said table, guiding springs supported by said standards and projecting over said table to direct the stalks from the gathering and conveying means toward the center of said table, and means for simultaneously turning said standards to move the guiding springs carried thereby to inactive positions beyond the confines of said table.

CALVIN WEAVER.